July 10, 1951  J. L. MILLER ET AL  2,560,052
METHOD OF MAKING TIRE MOLDS
Filed Dec. 16, 1948  3 Sheets-Sheet 1

INVENTORS
John L. Miller
and
John R. Houghter
BY
Ely & Frye
ATTORNEYS

INVENTORS
John L. Miller
and
John R. Boughter
BY
ATTORNEYS

July 10, 1951  J. L. MILLER ET AL  2,560,052
METHOD OF MAKING TIRE MOLDS
Filed Dec. 16, 1948  3 Sheets-Sheet 3
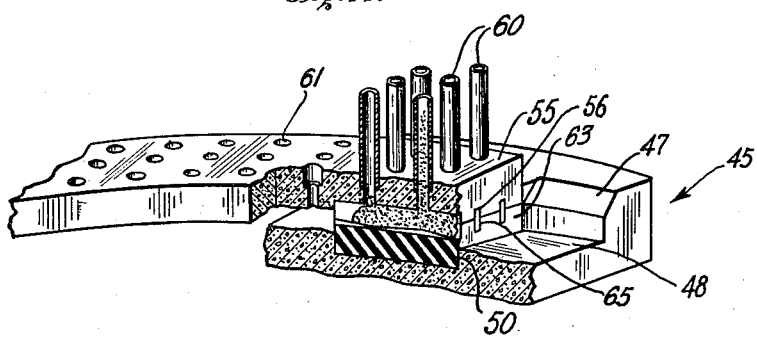
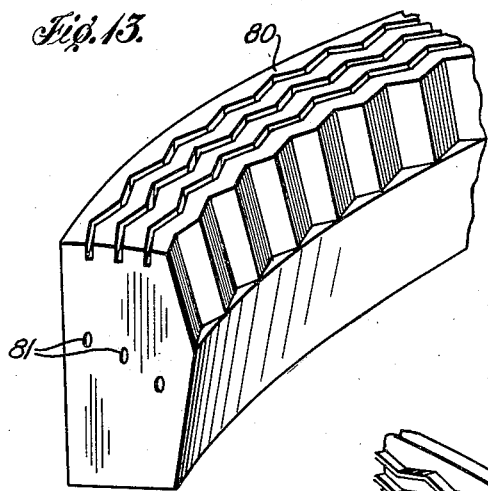
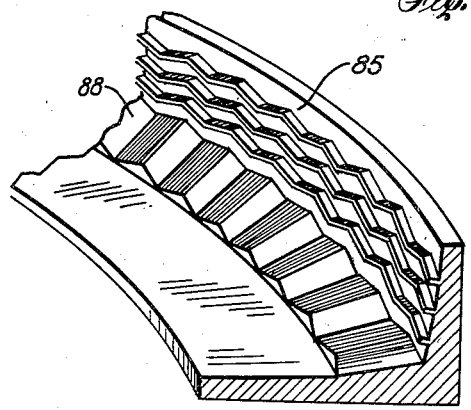
INVENTORS
John L. Miller
and
John R. Boughter
BY
Ely & Frye
ATTORNEYS

UNITED STATES PATENT OFFICE 2,560,052

METHOD OF MAKING TIRE MOLDS

John L. Miller and John R. Boughter, Akron, Ohio, assignors to The Firestone Tire & Rubber Company, Akron, Ohio, a corporation of Ohio Application December 16, 1948, Serial No. 65,576

6 Claims. (Cl. 18—55)

This invention relates to an improved method of making an annular mold, and particularly to an improved method of making a tire mold of either a circumferentially repetitive or nonrepetitive design.

One of the operations during construction of a pneumatic tire consists of placing an uncured tire in a suitable mold and simultaneously applying heat and internal pressure for a sufficient time to effect the desired vulcanization or cure. A high degree of accuracy is required in forming these molds to eliminate irregularities which might otherwise be molded into the tires to cause dynamic instability resulting in excessive and irregular wear during use.

In accordance with conventional tire mold practice, a mold of the circumferentially split type is usually formed from two substantially identical mold sections adapted, when complementally engaged, to define an annular cavity for receiving a "green" or uncured tire therein to define the desired tread design thereon as it is vulcanized in the mold. A mask of a tire or a section thereof will be referred to as a "positive" mold, while a shell type mold having a surface complementary to a tire mask will be termed a "negative" mold. The finished negative mold may be a casting of suitable material such as aluminum, brass, cast iron, or other metal alloys, but the invention defined herein relates to improvements in pattern making as distinguished from the casting of molds. The positive mold section employed in producing the negative tire mold sections may for example consist of a plaster, sand, and asbestos fiber mixture molded in arcuate sections and adapted to be combined to form a complete annulus.

A principal object is to provide an improved method of constructing a pattern model of a positive mold for use in forming, by a well known technique, another positive mold or core adapted for use in the actual pouring operation to form a complete negative mold of suitable metal.

Another object of the invention is to reduce the time and skill normally required in the construction of positive mold sections.

A still further object resides in the provision of a positive mold section of improved uniformity and accuracy of design.

A still further object is to improve the relatively low-cost cast type tire mold to obtain definition and accuracy heretofore obtainable only with the engraved type mold. Other objects will become apparent to persons skilled in the art upon examination of the drawings, description and claims appended thereto.

In the drawings, in which like parts are identified by the same reference numerals throughout, Fig. 1 is a perspective of a known apparatus employed in sweeping the major portions of the negative mold sections illustrated herein;

Figs. 2, 3, 4, 5, 6, 7, 8, and 9 illustrate in perspective and at various stages in development, a section of a negative mold adapted for producing a section of a positive mold in accordance with the principles of the invention;

Fig. 11 is a perspective view of a sectionalized portion of the negative mold section shown in Fig. 8, in an inverted position and with the tread grooves therein in registry with the grooves of the deformable mold, and illustrating tubular conduits in position for the introduction of molten wax to form the tread groove inserts.

Figure 1:
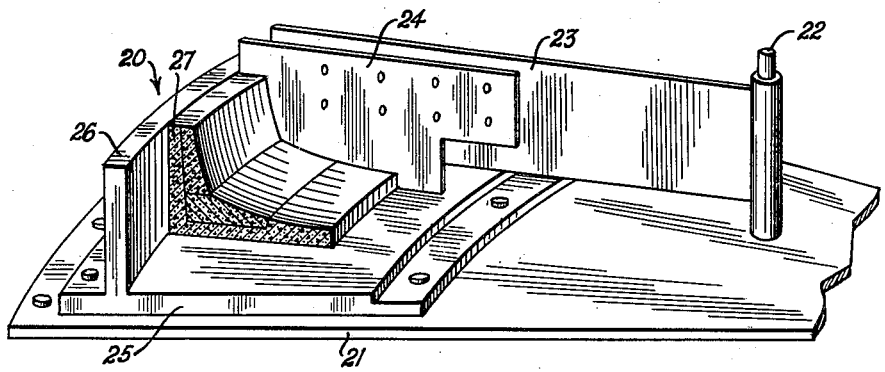

Fig. 13 illustraties a positive section molded by the method defined herein.

Fig. 14 illustrates in perspective, a fragmentary portion of a cast metallic negative mold produced by a core assembly comprising a plurality of positive mold sections shown in Fig. 13.

The invention relates to an improved method for forming a section of a positive annular mold of material which normally will not stand up under the heat induced by the molding operation. The invention therefore relates to improvements in pattern making technique rather than to improvements in the molding art as such, hence the detailed description contained herein covers only the production of the end product of the present invention, namely a pattern of a positive mold section. Supplied with this pattern, a person skilled in the molding art may readily reproduce, by employment of well known methods, a plurality of positive mold sections identical in configuration to the end product herein, but of a material possessing properties of porosity and heat resistance required for satisfactory performance during a pouring operation. The use of a relatively non-porous material for the production of a positive pattern mold results in increased accuracy and definition of design. The material used hardens at room temperature, and does not require pre-heating to obtain initial plasticity, since obviously thermo-plastic material could not be employed with wax tread inserts. Upon production of a plurality of positive mold sections suitable for use in a foundry, a complete annular core is assembled to be employed in a known manner to produce a complete negative tire mold, a portion of which is shown in Fig. 14.

Referring to the drawings,

Fig. 1 illustrates an apparatus 20 for sweeping moldable material into the form of mold sections. The apparatus comprises a sub-base 21 on which is mounted, by means of perpendicular pintle 22, supported by sub-base 21, a radius arm 23 carrying at an outer portion thereof a template 24 which may be of the removable or interchangeable type, or which may be adapted to be recut to effect the various sweeping stages hereinafter described. A secondary base 25 may be provided with an arcuate, vertically extending retaining wall 26 although such a wall is not always employed.

Formation of the mold sections shown in Figs. 2 through 9 respectively is initiated by depositing a suitable quantity of plastic-like material such as clay or plaster upon base 25 to be dammed up along wall 26. The first template 24 employed defines in radial section the configuration of the negative mold member 27 shown in Fig. 2, known in the art as a nest. The circumferential dimension of the nest thus formed will of course depend largely upon the tread design ultimately to be produced. The nest is preferably formed of a circumferential dimension at least twice that of the section of tread to be reproduced and it is normally desired to reproduce the minimum circumferential length of tread required to insure accuracy of a particular design when reproduced by the method herein described. Upon completion of nest 27, and complete setting or suitable hardening of the material, surfaces 28 and 29, Fig. 2, thereof are coated with an oily solution such as a solution prepared by mixing about 75 parts of alcohol with about 25 parts of castor oil to insure separation from nest 27 of a subsequently formed mold member. Next a workable material such as gypsum cement plaster is positioned as heretofore described to permit sweeping of a suitable template thereover to form a segmental ring 32. Ring 32 is formed in two sweeping operations, the first of which defines the general configuration of the ring, including an annular chamber 34 on the inner face of the ring. A second molding material, contrasting in color with the molding material of the initially formed ring, is placed within annular chamber 34 after proper hardening of the ring has taken place, and swept, through employment of another template, to provide an inlay type of construction comprising a main body portion and a ribbon-like layer 36. The composite construction of ring 32 facilitates the manual carving of a tread shoulder design in the ribbon portion 36 of ring 32, the contrasting colors of the two materials employed serving as a depth guage.

Figure 4:
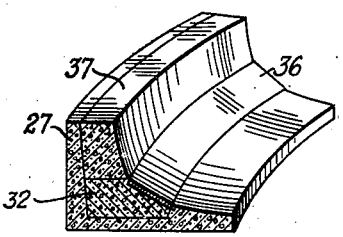

The next operation consists of forming, by the sweeping operation heretofore described, a tread ring 37, Fig. 4, of material inherently form-sustaining when set or hardened, but of a softness to permit carving therein. Slots 40 corresponding to the tread ribs of the particular design to be reproduced are next formed intaglio throughout the center portion of the tread ring and to a depth to provide suitable anchorage for ribs formed in a manner hereinafter described. Many of the current passenger tire treads include tread ribs of circumferentially repetitive design, such as the zig-zag tread shown herein, the ribs of which do not extend to any appreciable distance circumferentially of the tire without cyclical repetition of the basic zig-zag design. Some tire treads, of the so-called "noiseless" type, are not repetitive throughout the circumference of the tire, but even these tread designs are repetitive throughout selected circumferential portions of the tire and are followed by a design of different configuration which latter design in turn is repetitive throughout a certain circumferential portion of the tire. The method herein disclosed is suitable for the reproduction of positive mold sections for the ultimate molding of either type of tire. In the event a tire of the so-called "noiseless" type contains for example three designs, each different in noise characteristics, those three designs are normally sequentially repeated a plurality of times around the circumference of the tire. The reproduction of the required mold may therefore be effected through employment of this method by merely employing three positive mold sections, each with a different tread design, in any manner desired.

Figure 5:
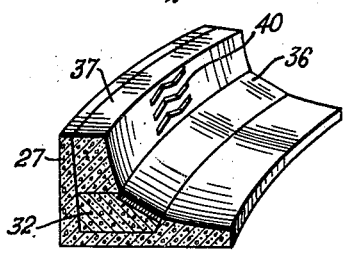
Figure 6:
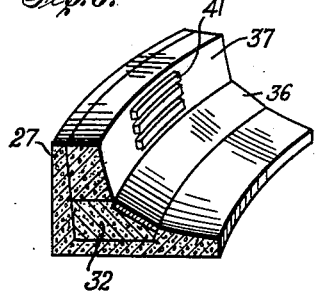

With nest 27, including the complementally associated rings 32, 36 and 37 as shown in Fig. 5 again disposed for sweeping by the apparatus of Fig. 1, and a suitable rib-forming template replacing template 24, moldable material adapted to be carved, when hardened, is forced into slots 40 of ring 37 to project from the face of the ring and to be swept into ribs 41, Fig. 6. Upon hardening of ribs 41, the ribs are hand carved to define the desired rib type tread pattern as shown at 42, Fig. 7. It has been found that accuracy of reproduction by the method hereinafter described is obtained when a pattern extending circumferentially to include one and one half or more fundamental rib cycles is reproduced by hand carving.

Figure 7:
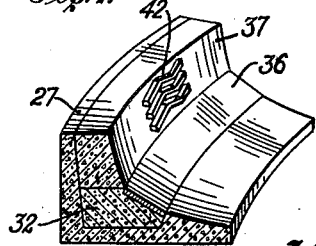
Figure 10:
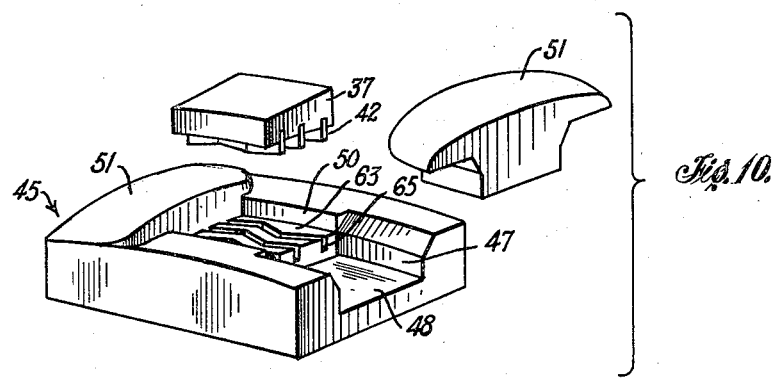
Fig. 10 is an exploded perspective view of a mold box containing a negative mold of a material which is normally form-sustaining, may be deformed under stress, but returns to its original shape upon removal of deforming stresses.

The next step in the method, not illustrated, consists of cutting out the centrally disposed section of ring 37, Fig. 7, bearing the tread design ribs 42, for use, as shown in Fig. 10, in the production of a negative mold generically designated 45. Mold 45 comprises a block-like base portion 46 provided with a transverse channel 47 including an arcuate bottom wall surface 48. Channel 47 leads into a centrally disposed well 50 of somewhat greater depth than the remainder of the channel. Detachable closure members 51 are complementally receivable within opposite ends of channel 47 to block off the channel on each side of the center well. With members 51 in position, well 50 is partially filled with a heated rubberlike material and ring 37 is disposed with ribs 42 in a depending position within well 50 to the full depth of the ribs and with that portion of the surface of ring section 37 intermediate ribs 42 in contact with and supported by the rubberlike material. Enough rubberlike material is used to bring the level thereof, with ribs 42 of ring section 37 immersed, to a height above the adjacent bottom surface 48 of channel 47 greater than the depth of the tread ribs 42. Well 50 is of a width to snugly receive mold section 37 between upper wall portions thereof. Upon cooling and setting of the rubberlike material within well 50, ring section 37 is removed therefrom, as are closure members 51, and mold 45 is ready for use as hereinafter described.

The rubberlike material used for casting the positive image 63 of the tread surface in the well 50 is selected preferably from the class of compositions known as plastisols. The plastisols sold commercially are usually liquid preparations comprising a fine dispersion of a vinyl resin suspended in a plasticizer such as dioctyl phthalate or esters of sebacic and phosphoric acids with long chain alcohols. Commercially prepared examples of such compositions are Nuplimold sold by the New Plastic Corp., (VJ) A-2238 sold by the Bakelite Corp., and Tygoflex sold by the U. S. Stoneware. These compositions, although furnished as liquids, may be heated and cast into a receiving mold to form masses which reproduce molding surfaces with great accuracy and assume on cooling a solid rubberlike condition resembling vulcanized tube stock, although somewhat softer. While such materials are usually furnished to the user in a liquid state, they are furnished also by some manufacturers as a gel, for example, Korogel, a plasticized polyvinyl product manufactured and sold by B. F. Goodrich Co. in the form of jelled pellets. This latter material when melted and cast apparently undergoes no appreciable chemical change and on cooling returns to the original jelled state.

Figure 8:
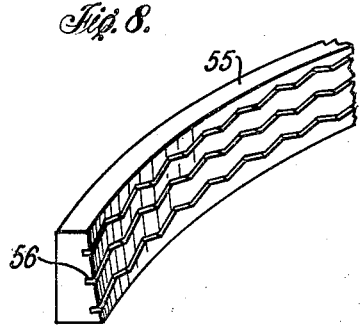

A second tread ring 55, Figs. 8 and 11, is swept by the process heretofore described, and provided throughout the entire length thereof, as shown in Fig. 8, with slots 56 similar to the slots 40, Fig. 5. A plurality of bores 61 are provided at spaced intervals along the length of each slot, as shown in Fig. 11, for the reception of tubular conduits 60 for a purpose hereinafter described.

Figure 9:
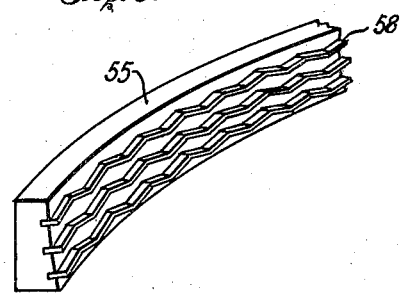

The next step in the process consists of forming wax tread ribs 58, Fig. 9, filling slots 56 of ring 55 to extend therefrom throughout the entire length of ring 55 by a series of molding operations in which mold 45 is utilized in a manner to avoid the necessity of hand carving ribs 58 along the length of the ring 55. This is accomplished by placing ring 55, with the slotted face downwardly on positive image 63, and concentric with arcuate surface 46 in the manner shown in Fig. 11. Starting with one end of the ring 55 in the position shown in Fig. 11, and with suitable tubular conduits 60 inserted in all bores 61 throughout the projected area of well 50, with the slotted face of ring 55 contiguously engaging the face of the rubberlike material 63 within mold 45 and with slots 56 vertically aligned with corresponding slots 65 of the mold, heated wax is introduced through conduits 60 to flow through bores 61 and completely fill the space defined by the mold slots 65 and the ring slots 56.

Ring 55, which has been suitably clamped in any well known manner, not shown, to prevent displacement thereof in respect to mold 45, is allowed to remain in position for a sufficient period of time to allow complete setting of the wax, at which time the ring is removed from mold 45 to be shifted longitudinally of the mold and reinserted therein at a distance of one complete tread design cycle or "pitch" in respect from its original position, the remaining one half pitch of the previously molded wax tread ribs being complementally received in mold slots 65 immediately adjacent the margin of the rubberlike mold portion to position ring 55 for a subsequent charge of molten wax through conduits 60, which have been moved a corresponding distance along ring 55. In this manner registry is maintained between the mold slots and the slots of ring 55. Wax entering the mold during subsequent molding steps gives up sufficient heat during cooling partially to melt and become fused with the adjacent portion of the previously molded wax tread ribs deposited within the rubberlike mold.

The above described wax molding operation may best be effected by pouring melted wax in one of the tubes 60 leading to bores 61 until the wax is seen to rise in an adjacent tube associated with the same tread groove. Since a plurality of bores 61 are associated with the same tread groove 56, and the bores are spaced longitudinally of ring 55 at intervals to insure communication between at least two bores and the tread grooves of image 63, regardless of the position of ring 55 during a molding operation as seen in Fig. 11, one of the bores may thus serve as an inlet for the melted wax while the other bore serves as an air vent and to provide a small amount of hydrostatic pressure normally required to insure complete filling of the registered tread grooves 56 and 65 respectively with the melted wax.

Upon cooling of the wax following each molding operation, ring 55 is lifted vertically of the rubber-like plastic positive mold 63 to disengage the newly cast waxed tread rib inserts 58 from the slots or grooves 65 thereof. Since both ring 55 and the tread ribs 58 formed thereon are of arcuate contour, the necessity of providing a positive mold 63 of deformable material to permit removal of the ribs 58 from the mold after casting becomes apparent. A green wax designated as C-547 and manufactured by the Zopher Mills, Inc., was found to be satisfactory for casting tread groove inserts. However, other thermoplastic materials having a sufficiently high melting point to withstand the heat generated during the setting of plaster in forming positive mold section of Fig. 13, and having a melting temperature low enough to avoid softening or deformation of the plastisol of mold 45 may be employed.

Figure 2:
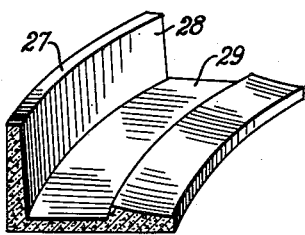
Figure 3:
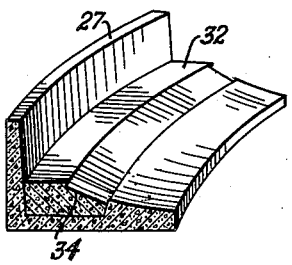
Figure 12:
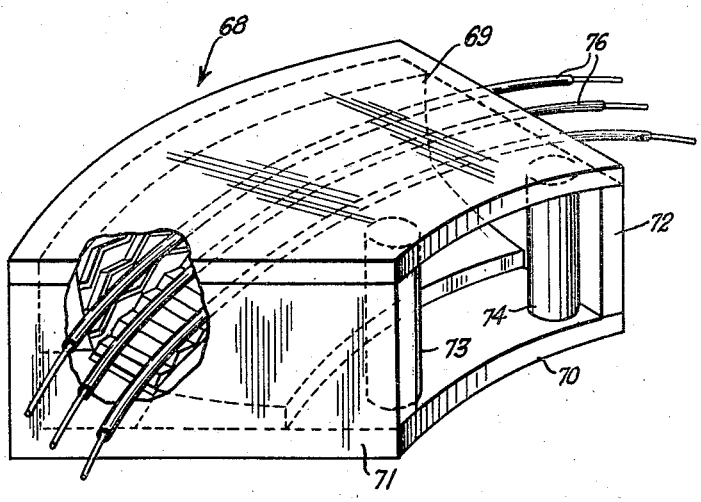
Fig. 12 illustrates the negative mold section of Fig. 9 enclosed in a housing preparatory to the molding of a positive section.

With the completion of the negative tread forming ring 55 by the method above described, ring 32 of Figs. 3 through 7 is hand carved, at least in part, to provide a suitable design, such as the fluted or serrated design as shown at 88 in the mold of Fig. 14, throughout the shoulder portion of the tire to be molded. Ring 32 was provided, as above described, with an inlaid portion 36 to facilitate hand carving throughout that surface of the ring. In actual practice, the ring segment as shown in Figs. 3 through 7 is frequently divided into smaller segments, for example a segment containing one and one-half or two tread pitches, and that segment reproduced, preferably by a molding process similar to the process above described. A plurality of ring segments thus produced are assembled, together with the completed ring 55 of Fig. 9, and a nest 27 as shown in Fig. 2, to provide the finished nest of Fig. 12. As shown in Fig. 12, suitable enclosing elements are provided to form a housing 68 about the completed nest, defining with the nest assembly, three sides of a circumferential section of an annular mold. Employment of the assembly comprising housing 68 and the completed nest disposed therein in a molding operation hereinafter described is productive of the positive mold section of Fig. 13.

Referring again to Fig. 12, housing 68 includes planate top and bottom elements 69 and 70 respectively, side elements 71 and 72, and post-like spacer members 73 and 74, the exact construction of the housing forming no part of this invention. Tubes 76, preferably of rubber, are disposed in the manner shown to define arcs concentric with the arc defined by ring 55, to extend through side wall members 71 and 72. Tubes 76 house wire-like elements of a thickness to fill the bores of the tubes. The wires within tubes 76 serve rigidly to maintain the tubes in the position shown during the molding operation and to facilitate removal of the tubes from the cast positive end section of Fig. 13 upon withdrawal of the wires prior to withdrawal of the tubes. In this manner arcuate bores are provided at preselected positions through the plaster cast positive mold section.

Prior to the introduction of plaster or cement to the interior of housing 68, the interior surfaces of the nest assembly and the housing may be lightly coated with orange shellac. Immediately prior to pouring, a small amount of water is poured into the mold with housing 68 held open end upwardly. A suitable plaster or cement mix is then introduced to the mold, and the water is forced to the upper surface of the molding material to wet the interior surface of the mold as the material rises and thus prevent entrapping air in the tread detail. Upon setting of the plaster material, housing 68 is of course dismantled and tubes 76 removed from the casting. Ring 55 may if desired be removed from the casting before it has completely cooled since the plaster normally takes a permanent set prior to complete cooling. Since the temperature of the mold material is at all times lower than the melting temperature of the wax ribs 58 of ring 55, ring assembly 55 may be used a plurality of times.

Rings 55 of Figs. 8, 9 and 11 are illustrated broken away at one end thereof, and while the circumferential length of these rings, and hence the length of the positive mold section 80, Fig. 13, may be arbitrarily chosen, it has been found satisfactory to produce such sections to extend through an angle of 45°, eight of the positive mold sections being required for a complete core assembly. Arcuate bores 81 provided in positive mold section 80 as above described permit the application of vacuum generating means for the withdrawal of gas, steam and water from the interior thereof during the subsequent molding operation in conformance with known molding technique. As above stated, the end product of the present invention is the relatively non-porous positive mold section 80 of Fig. 13, characterized by sharp definition of detail and adapted to serve as a pattern maker's model for the duplication, by known methods, of similar positive mold sections of a material more suitable for use in a metal pouring operation. A mold employing an annular core formed from such sections is employed to produce one half of a circumferentially split tire mold, a broken segment of which is designated by reference numeral 85, Fig. 14.

What is claimed is:

1. A method of forming staggered type groove-defining tread ribs on the surface of a negative mold member to be used for forming a positive pattern, comprising providing staggered grooves in said surface, providing spaced passages leading from said grooves through said member, providing a mold of deformable material with grooves identical with and adapted for registry with the grooves of said negative mold member, the grooves of said mold being of short length as compared with the grooves of said negative mold member, positioning said member on said mold with respective grooves thereof in registry, introducing through at least one of said spaced passages a fluid material to fill said registered grooves, said material being adapted to solidify therein in bonded engagement with the groove defining surfaces of said member, removing said member, together with said material in bonded relation, from said mold, re-registering said member with said mold with a portion of the ribs formed thereon disposed in said mold groove, and repeating the molding operation to extend the ribs formed on said member.

2. The method of forming a section of a tread ring consisting of forming a smooth surface ring section having a concave surface, providing grooves longitudinally thereof along said concave surface, disposing moldable material within said grooves to extend outwardly therefrom, sweeping said material to form continuous smooth ribs, carving said smooth ribs to form at least one pitch of a repetitive design, reproducing from the carved portion of said ring section a complementary mold of resilient material with an intaglio reproduction of at least one pitch of said repetitive rib design therein, forming a second tread ring having grooves therein for registry with the intaglio design of said mold and extending longitudinally of said second ring at least twice the longitudinal dimension of the intaglio mold design, and forming, by sequential molding operations, with the grooves of said ring in registry with the intaglio mold design, a repetitive rib design delineated by the grooves of said second ring and bonded within the grooves thereof to project outwardly from the grooved surface of said second ring.

3. A method of forming a segmental portion of a tread ring consisting of forming an arcuate element having a concave surface, providing said concave surface with a plurality of longitudinally extending grooves of non-linear configuration, subjecting said segment to a sweeping operation to dispose a sufficient amount of moldable material within said grooves to be anchored therein and to extend outwardly from said concave surface to provide a smooth rib extending longitudinally of said segment, carving the side walls of said smooth rib to define planes of registry with said grooves, employing the rib design thus formed to reproduce in mold of resilient material, a complementary groove design, forming a second ring portion with grooves identical with the grooves of said first ring but of longer length, and employing said mold to reproduce, through a sequence of molding operations, a continuous rib along the entire length of the groove of said second ring portion.

4. The method of forming a section of a tread ring consisting of forming a ring section having a smooth concave surface, providing grooves longitudinally thereof along said concave surface, disposing moldable material within said grooves to extend outwardly therefrom, forming said material into continuous smooth ribs, carving said smooth ribs to form at least one pitch of a repetitive tread design, reproducing from the carved rib portion of said ring section a complementary mold with an intaglio reproduction of at least one pitch of said repetitive rib design therein, forming a second tread ring having grooves therein for registry with the intaglio design of said mold and extending longitudinally of said second ring at least twice the longitudinal dimension of the intaglio mold design, and forming, by sequential molding operations, with the grooves of said ring in registry with the intaglio mold design, a repetitive rib design delineated by the grooves of said second ring and bonded within the grooves thereof to project outwardly from the grooved surface to provide continuous ribs.

5. A method of forming staggered type, groove-defining tread ribs on the surface of a negative mold member to be used for forming a positive pattern, comprising forming staggered grooves in said surface, providing pouring passages leading through said member to said grooves, providing a mold of resiliently deformable material having grooves identical with and adapted for registry with the grooves of said negative mold member, positioning said member on said mold with respective grooves thereof in registry, introducing through at least one of said passages a fluid material to fill said registered grooves, said material adapted to solidify in said grooves, in bonded engagement with the groove surfaces of said member, and, after solidification of said material, removing said member from said mold together with the ribs defined by said material in solidified and bonded condition.

6. A method of making a positive pattern for use in the making of negative, annular molds, which comprises forming an arcuate section of an annulus, inscribing non-rectilinear grooves on the inner surface of said section, filling said grooves with a plastic materal with an excess of said material extending from said section, sweeping said excess of material circumferentially of said section along lines defining the extremities of said grooves crosswise of said section, carving the remaining material of said excess to provide extending ribs with walls aligned with the walls of said grooves, forming a negative image of said ribs in a resilient material by molding, providing a second arcuate section of an annulus, forming grooves in said second section of identical pattern with the grooves in the first-mentioned section, superimposing said second section on the first-mentioned section with the grooves in the latter aligned with a portion of the grooves in said second section, introducing a settable, fluid material into said aligned grooves to form ribs, removing said second section together with the set ribs from the grooves of said resilient material, advancing said second section and inserting end portions of the latter mentioned ribs in end portions of the grooves of said resilient material so as to superimpose further grooves of said second section over grooves in said resilient material, pouring further settable material into said aligned grooves, and repeating until all grooves of the said second section are provided with extending ribs, and thereafter employing the thus ribbed, second section to form a positive pattern by molding.

JOHN L. MILLER.
JOHN R. BOUGHTER.

REFERENCES CITED

The following references are of record in the file of this patent:

UNITED STATES PATENTS

| Number | Name | Date |
|---|---|---|
| 1,634,106 | Hopkinson | June 28, 1927 |
| 1,944,744 | Kuhlke | Jan. 23, 1934 |
| 1,989,438 | Woock et al. | Jan. 29, 1935 |
| 2,074,368 | Corner | Mar. 23, 1937 |
| 2,218,090 | Marinsky et al. | Oct. 15, 1940 |
| 2,388,986 | Morin | Nov. 13, 1945 |
| 2,435,643 | Bean | Feb. 10, 1948 |